Aug. 18, 1959  H. CLARK ET AL  2,899,866
BLAST-CONTROLLING MEANS
Filed Jan. 20, 1956  3 Sheets-Sheet 1

INVENTOR.
Herbert Clark
Marvin G. Starr
Paul M. Owen
BY W. R. Robertson
AGENT

2,899,866
BLAST-CONTROLLING MEANS

Herbert Clark, Dallas, Paul M. Owen, Arlington, and Marvin G. Starr, Dallas, Tex., assignors to Chance Vought Aircraft Incorporated, Dallas Tex., a corporation of Delaware Application January 20, 1956, Serial No. 560,379

13 Claims. (Cl. 89—37.5)

This invention relates to aircraft provided with armament, and more particularly to means which effect a controlled release of blast gases discharged from armament of an aircraft and thereby prevent the blasts from having deleterious effects on the propulsive power plant, airframe, and accessories of the aircraft.

In an aircraft carrying armament, for instance guns or rockets, the atmospheric disturbances set up by the propulsive blasts and the shock waves of discharged projectiles are frequently so severe as to constitute a potent cause of malfunctioning and damage in airframe accessories such as indicating instruments, electronic equipment, and electrical relays, and often are a cause of damage and failure in airframe components. Furthermore, large losses in engine efficiency, as well as incipient or immediate engine component failures, are often attributable to disturbances attendant upon the discharge of projectiles. The damages caused by such disturbances may be quite serious. In a turbojet engine, for example, a firing burst may initiate a series of events including engine compressor stall, engine overheating, and cracked-away turbine blades, the latter of course usually being followed by further heavy damages to the engine and aircraft. In the airframe, these disturbances have been known to buckle skins, precipitate the failure of rivets and other fasteners, interfere with instrument operation, and cause electrical relays to open or close in ways effecting improper and untimely operation of items or systems controlled by the relays. As to engine power losses, moderate to total loss of power may occur during and after the firing of projectiles, a period during which, particularly in combat, the development of full rated power by the engine is apt to be most vitally needed.

Disturbances accompanying the firing of projectiles are passed through the air outside the aircraft into the air entering and passing through the power plant, and in some cases a considerable volume of the blast gases may enter the air induction system and pass with inducted air into the engine or engines. The result, in a ramjet engine, is a loss of power which may become total if, as is likely, flame-out occurs. In a turbojet engine, the result is often a compressor stall followed by flame-out and complete power loss, or otherwise followed by large power losses, severe overheating of the engine turbine, and loss of flame in the engine's afterburner, if the engine is provided with such. To terminate such malfunctioning and restore a turbojet engine and its afterburner to proper operation, it is frequently necessary to reduce the engine throttle setting or even to shut down and restart the engine in flight. A ramjet or turbojet engine which has experienced a flame-out must of course be restarted before power can again be obtained from it. At best, such losses of power are time-consuming and inconvenient; at worst, they may be disastrous to the aircraft and to the pilot.

Disturbances caused by the firing of projectiles are generally more deleterious in their effects upon an airframe component, accessory, or engine when the particular component or accessory, or the inlet of the engine air duct, is located where it is exposed in relatively direct fashion to the shock waves of the projectiles and to the expanding blast gases and/or the shock waves emanating therefrom, and the probability of damage or mulfunction tends to increase with a decrease in the distance separating the exposed part from the blast source. When a particular component, accessory, or duct inlet is exposed to the disturbances set up by the firing of two or more armament units (for example, two or more guns) the likelihood of damage or malfunction is increased if those units fire in unison, for the intensity peak of a composite disturbance contributed to by the simultaneous firing of two units is often several times greater than that accompanying the firing of a single unit, and is consequently more potent in its effects on airframe, accessories, and engine.

Simultaneous blasts from sources located on opposite sides of an airplane fuselage are ordinarily isolated from each other by the intervening airframe structure, and consequently cannot exert a combined, mutually reinforced effect, such as described above, on a given airframe component or accessory or on an engine whose particular air duct inlet is located at one lateral side of the fuselage. In the case of an engine whose duct inlet is located on the aircraft centerline above or below the fuselage or in the fuselage nose, however, the engine may readily be affected by blasts originating on opposite sides of the fuselage. The same is true of an engine supplied with air by the inlets, one on each side of the fuselage, of twin ducts whose airflows merge at or upstream of the engine.

As is readily apparent, it is greatly to be desired that means be provided in an aircraft for preventing the blasts accompanying the discharge of projectiles by armament provisions carried thereby from having harmful effects on the airframe components and accessories or on the performance and parts of the aircraft power plant. This is efficiently accomplished by the blast-controlling means of the present invention, which, briefly described, comprises a blast gas deflecting means that reduces the severity of individual blasts at each projectile-firing location to a level such that no one blast is of sufficient intensity to be harmful; and blast-timing means which prevents the mutual reinforcement of blasts by constraining the armament units of the aircraft to a firing pattern wherein the time interval between individual blasts is made long enough to obviate serious mutual reinforcement. Lest the above be misunderstood, and to convey the same meaning in different words, the blast-timing means apportions the discharge, in a predetermined order, of the blasts into the blast deflecting means, and this order is such that blasts likely to reinforce each other if discharge simultaneously are always released to the deflecting means at substantially separate times.

The deflecting means includes, at each gun barrel or rocket tube, a deflection chamber with which may be employed a blast diffuser and a specially constructed blast tube, the deflection chamber having in one of its end walls a first opening for snug reception of the gun barrel or rocket tube, the muzzle end of which protrudes slightly into the chamber, and having in its other end wall a second opening having communication with the atmosphere. This communication may be direct, or, if such is used, through a blast tube having, at one end, a gas-tight connection with the second opening of the deflection chamber, the blast tube at its other end being open to the outside air. The chamber, blast diffuser, and blast tube are, of course, aligned with the rocket tube or gun bore, and their parts furnish adequate clearance for the fired projectiles. The blast diffuser comprises a tubular member mounted within the deflection chamber on the end of the rocket tube or gun barrel, one of its ends receiving the barrel or tube, and the other being open to the interior of the deflection chamber. The blast diffuser has annular interior baffles which deflect some blast gases from the blast jet issuing from the tube or barrel, and also has a series of wall openings which permit the deflected gases to pass into the deflection chamber; the remaining gases, and of course, fired projectiles, pass into the chamber through the open end of the blast diffuser. In addition to the first and second openings mentioned above, the chamber has one or more side wall openings communicating with the outer air, and may be provided with one or more transverse baffles, the function of the baffles being to deflect blast gases from the blast jet before they reach the blast tube and direct them overboard through the side wall openings in a direction in which they will have minimum effect upon the airframe and power plant. The blast tube is preferably cut away and flared along one of its sides to provide a mouth continuous with its forward end opening and lying flush with an exterior surface of the aircraft. The blast tube may be provided with one or more transverse baffles whose outer edges are approximately flush with the contour of the outer surface surrounding the blast tube mouth and whose ends are rigidly attached to the mouth walls. The baffles deflect blast gases from the tube and direct them into the outside air in such direction that their undesirable effects are reduced to a minimum value.

The blast-timing means includes electronic or electrical means for delivering regularly spaced electrical firing impulses to the several armament units (for example, rocket tubes or guns) in a predetermined order which is such as to insure apportionment of the blasts to the several chambers in the predetermined order previously explained wherein blasts which could reinforce each other may never occur together, but will always be delivered discretely and in alternation to separate chambers. The timing means may vary in form, any arrangement being satisfactory which will deliver suitable electrical impulses to the several units at the desired times. For example, the projectile-firing impulses may be timed and distributed by a self-driving electrical stepping switch, the switch manufactured by C. P. Clare & Co. of Chicago, Illinois, under their part number RP5778 being representative of a usable class of switch. Because of its light weight and insensitivity to changes in altitude, combined with excellent accuracy, reliability, and durability, the blast-timing means of a preferred form of the present invention includes a free-running multivibrator circuit whose output is fed through differentiation circuits into thyratron circuits that, under the control of the operator of the aircraft, supply firing voltages to the armament units of the aircraft.

It is accordingly, a major object of this invention to provide a highly efficient apparatus for reducing to a harmless level the effects of blasts, attendant upon the firing of armament carried by an aircraft, on the operation and/or structural integrity of the engine and airframe components and accessories of the aircraft.

Another object is to provide an apparatus of the sort specified above having timing means for constraining armament units in the aircraft to fire alternately and at individually distinct points in time to the end that the effects of no more than one blast caused by the firing of a projectile may be felt at a time by an engine and the airframe components and accessories of the aircraft, this being accomplished without appreciable diminution of the firing rate of any armament unit.

A further object is to provide an apparatus of the sort specified above having blast deflecting means whereby a large portion of the blast gases of each armament unit of the aircraft are deflected from their initial direction, reduced in velocity and density, and progressively released from the aircraft in a favorable direction or directions, thus reducing the severity of their effects on the engine and airframe of the aircraft and minimizing their entry into the air inducted into the engine.

Yet another object is to provide an apparatus of the character thus far specified the parts of which are relatively easy to construct, simple in operation, highly durable, and of excellent reliability.

Still another object is to provide a method and an efficient, reliable means for the practice of the same directed to preventing armament blasts from contributing to malfunction in an engine of an aircraft carrying said armament units, said malfunction being characterized by any or all the phenomena known as compressor stall, overheating, and flameout in the engine.

Other objects and advantages will be apparent from the specification and claims, and from the accompanying drawings which illustrate an embodiment of the invention.

Referring now to the drawings, a specific embodiment of the present invention will be described. With initial reference to Figure 1, the airplane 20 represented therein is propelled by a power plant including left- and right-hand turbojet engines (left-hand engine 21 shown) housed within the fuselage 22 and expelling exhaust jets from the aft end 23 thereof. The engines are optionally provided with afterburners, the afterburner 24 for the left-hand engine 21 being shown in the drawing. The left-hand engine 21 and its afterburner 24 are supplied with air by a left-hand air duct 25A. This duct 25A is connected at its aft end to the inlet end of the engine 21, extends forwardly therefrom, and at its open forward end or inlet 26 lies outside the fuselage 22 adjacent a fuselage left-hand side panel 27 from which it is separated by the relatively narrow width of a fuselage boundary layer air removal duct 28. The right-hand engine and afterburner (not shown) similarly are supplied with air by a right-hand duct 25B which is, in its form and location, substantially the right-handed counterpart of the left-hand duct 25A. The inlets of the two ducts 25A, 25B are to a large extent isolated from each other by the intervening fuselage 22, and lie aft of the major portion of the cockpit canopy 29. Left- and right-hand wings 30A, 30B of the aircraft are joined to the fuselage 22 in symmetrically opposite locations somewhat aft of the duct inlet 26.

Figure 1:
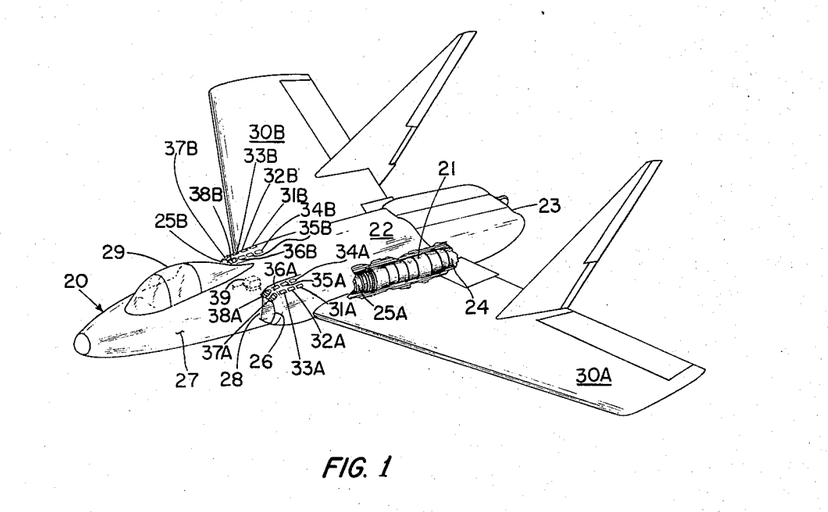
Figure 1 is a perspective view of an aircraft to which one form of the present invention has been applied in which are represented the external components of the blast deflecting means and, as shown in dotted lines, the case or enclosure of the blast timing means.

The aircraft of the example carries four armament units, each unit consisting of a gun employing ammunition whose primers are electrically fired. Of the four guns, two are mounted side by side in the fuselage 22 just above the left-hand engine air duct 25A in such positions that their muzzles extend to points within the projected contour of and directly aft of an upper portion of the left-hand air duct inlet lip 26. Projectiles fired from the left-hand outboard gun pass through an elongated deflection chamber with blast gas exit openings 31A, 32A, 33A and emerge from the airframe through a specially constructed blast tube 37A which opens to the atmosphere at the duct lip 26. The left-hand inboard gun is similarly provided with a deflection chamber having blast gas exit openings 34A, 35A, 36A and with a blast tube 38A. The remaining two guns are installed in the fuselage 22 above the right-hand engine air duct 25B in locations symmetrically opposite the two left-hand guns, and are similarly and respectively provided with blast tubes 37B, 38B and with deflection chambers, the blast gas openings of the latter appearing at 31B—36B. The airplane is provided with a gun fire control system regulating the operation of the guns and items associated and cooperating therewith. The blast timing means, the electronic components of which are housed in a protective case 39 mounted in any convenient location in the airplane 20, is functionally a part of the fire control system and will be described in detail in later paragraphs, the balance of the fire control system being described only to the extent necessary for a complete understanding of the blast timing means of the present invention.

The blast gas deflecting means, as applied to the airplane of the present example, will now be described in detail. Blast gas deflecting means components are employed in association with the guns located on both the left- and right-hand sides of the airplane above the engine air ducts 25A, 25B. Except for the blast diffusers, all of which may be identical with each other, the blast gas deflecting means components employed on the right-hand side of the airplane 20 are opposite-handed to those used on the left-hand side, but in all other important respects are identical in form, location, mounting, and function to their left-handed equivalents. The same may be said concerning the right-hand guns and the right-hand engine air duct 25B. Consequently, it will be necessary herein to describe in detail only the left-hand blast deflection means components and, to the extent found needful, the left-hand guns and engine air duct 25B, and it will be understood that this description (when their opposite-handedness, where applicable, is borne in mind) applies also, except as may otherwise be noted herein, to the right-hand blast deflection means components, guns, and engine air duct.

Figures 2, 3:
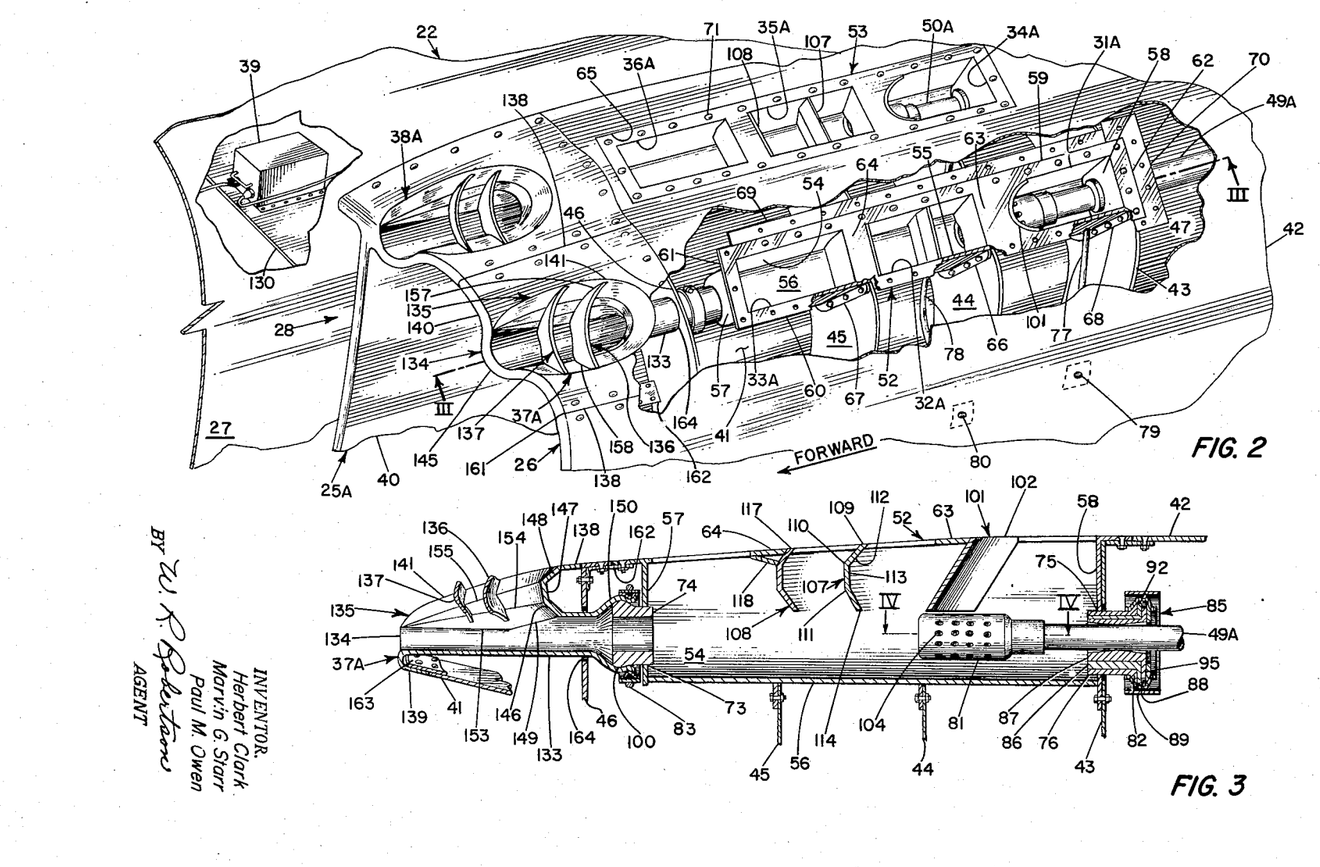
Figure 2 is an enlarged perspective view of part of the left-hand side of the fuselage and engine air duct having some of the fuselage and duct fairing skins cut away to show more fully the blast timing means and the deflection chamber, blast diffuser, and blast tube of the blast deflecting means.
Figure 3 is a longitudinal median sectional view of the blast tube and deflection chamber taken in a plane parallel to the side walls of the latter along the line III—III of Figure 2.

Reference is now made to Figure 2. At its inlet, the inboard side of the left-hand engine air duct 25A is formed by a substantially flat inboard wall 40 which separates the engine air duct from the left-hand boundary layer air duct 28, the latter lying between the inboard wall 40 and the fuselage side panel 27, and the remainder of the engine air duct periphery is formed by an outboard wall 41 which is generally semicircular in cross-section. From its juncture with the inboard wall 40, the outboard wall 41 extends inward to the fuselage side panel 27, thus providing upper and lower walls for the boundary layer air duct 28. Around its forward portion extending outside the fuselage 22, the engine air duct 25A is covered by a skin 42 which fairs the duct to the fuselage. The duct fairing skin 42 extends concentrically around the duct outboard wall 41 and is spaced therefrom by several formers such as 43, 44, 45, 46. Between the fairing skin 42 and duct outboard wall 41 lies the forward end of a left-hand gun compartment 47 whose aft end extends into the fuselage 22. At the forward edge of the duct lip 26, the duct outboard wall 41 and the fairing skin 42 coalesce and thus jointly close the forward end of the gun compartment 47. On its inboard side, the gun compartment 47 is bounded by the side panel 27, and its aft portion may be separated by appropriate walls (not shown) from the remainder of the fuselage interior, with which the compartment would otherwise be continuous.

A left-hand inboard gun having a barrel 50A is mounted in the gun compartment 47 in such fashion that its bore is generally parallel with the longitudinal axis of the airplane and is aligned with a point lying in or near the general contour of the duct inlet lip 26 and somewhat outboard of the duct inboard wall 40. The forward end of the barrel 50A extends to a point lying some distance, such as several feet, aft of the duct lip 26. A left-hand outboard gun with barrel 49A is installed in the compartment 47 in a manner similar to that of the left-hand inboard gun, and lies generally parallel to, outboard of, and slightly below the latter. Little further explanation of the guns 49A, 50A is needed for an understanding of the present invention except to indicate that they are governed by an electrically operated fire control system comprising the blast-timing means and, with the various pilot-regulated components of the fire control system properly set, are caused to fire when the pilot operates a trigger switch available to him in the cockpit. In the example shown, the fire control system permits the pilot to choose whether the two outboard guns (left-hand and right-hand), the two inboard guns, or all four of the guns shall fire when the trigger switch is operated.

A left-hand outboard blast gas deflection chamber 52 which is rigidly mounted in the gun compartment 47 receives the muzzle end of the outboard gun barrel 49A and extends forwardly therefrom toward the duct lip 26. Of elongated, trough-like form and being axially aligned with the bore of the outboard gun barrel 49A, the chamber 52 has a pair of spaced-apart, parallel, rectangular walls 54, 55 whose outer edges lie approximately flush with the inner surface of the surrounding duct fairing skin 42 and whose inner edges are connected by a third wall 56 extending therebetween. Aligned cut-outs are made where required in the outer edges of the formers 43, 44, 45 to provide snug clearance for the chamber walls 54, 55, 56. From their inner to their outer edges, the walls 54, 55 lie in planes which slant outwardly from the vertical at an angle of roughly 45 degrees. For convenience, and to adopt a terminology which will render the present description of the left-hand outboard deflection chamber 52 consistent in its applicability also to the left-hand inboard chamber 53, as well as to the right-hand inboard and outboard chambers (not shown), the first two walls are herein designated as the inboard wall 54 and outboard wall 55, while the third is termed the bottom wall 56. The chamber 52 is closed at its forward and aft ends respectively by a forward wall 57 and an aft wall 58.

The inboard, outboard, forward, and aft walls 54, 55, 57, 58 of the chamber 52 are provided along their respective outer edges with flanges 59—62 which extend generally normal to those walls and away from the interior of the chamber 52. At their outer edges, the flanges 59—62 exactly fit the edges of a cut-out (not shown) made in the fairing skin 42, and lie in flush contact with that skin 42. This cut-out does not appear in the referenced figure because the skin 42 is shown as cut away all around the outboard chamber 52; the cut-out for the outboard chamber, however, is entirely similar to the skin cut-out 65 shown for the inboard chamber 53.

To add to the structural strength of the chamber 52, the inboard and outboard flanges 59, 60 may well be connected by cross-pieces 63, 64 which extend across the outer side of the chamber 52 and tend to hold the inboard and outboard walls 54, 55 parallel and to prevent their bulging. Although the flanges 59—62 and cross-pieces 63, 64 may be formed or assembled in any way found expedient, it has been found convenient to fabricate them in one piece from a single plate, out of the face area of which plate the necessary material is removed to leave joined together the desired flanges and cross-pieces, which then are fastened, as by welding, to the chamber walls 54, 55, 57, 58.

The chamber 52 is thus left open along most (or, if no cross-pieces are used, along all) of its outboard side. In the particular example shown, the flanges 59—62 and cross-pieces 63, 64 define an aft opening 31A, a middle opening 32A, and a forward opening 33A. The inboard and aft flanges 59, 62 are rigidly joined by splice plates 69, 70 and suitable fasteners, in the well-known manner of a flush patch, to the fairing skin 42. Although, to make possible an unobstructed view of the chamber, they are omitted from Figure 2 of the drawing, splice plates and fasteners similar to the plates 69, 70 and fasteners 71 mentioned above are used to rigidly attach the outboard and forward flanges 60, 61 to the fairing skin 42. To make more secure the mounting of the chamber 52 in the gun compartment 47, two peripheral flanges 66, 67 are provided about the chamber exterior. The first flange 67, located near the forward end and extending around the three closed sides of the chamber 52, is rigidly attached to the walls 54, 55, 56, extends radially outward from the chamber, and lies against a former 45, to which it is rigidly attached by appropriate fasteners. A second, similar flange 66, located near the middle of the chamber 52, lies against and is fastened to a second former 44. The aft wall 58 is made larger than the area defined at the chamber aft end by the inboard, bottom, and outboard walls 54, 56, 55, and thus in effect forms a peripheral flange 68, similar to the flanges 66, 67 mentioned above, which in turn lies against and is fastened to a former 43.

The forward wall 57, as best seen in Figure 3, is pierced by an opening 73 aligned with the barrel 49A. A coupling tube 74, also aligned with the barrel 49A, fits snugly into this opening 73 and is firmly attached therein, as by welding, in such manner that all spaces which might exist between the walls of the tube 74 and the edges of the opening 73 are closed and made gas-tight. The forward wall 57, except where pierced by the coupling tube 74, completely closes off in gas-tight fashion the forward end of the chamber 52. Projectiles and a certain fraction of the blast gases from the gun barrel 49A pass through the coupling tube 74 and thence, through a specially designed blast tube 37A (to be described), out of the airplane.

Except where pierced by an opening 75 in which is rigidly mounted in gas-tight fashion an adapter tube 76 through which the gun barrel 49A protrudes into the deflection chamber 52, the aft wall 58 seals the aft end of the chamber 52.

At its gravitationally lowest point, which in the outboard chamber 52 (Figure 2) of the present example, lies in the bottom wall 56 at its juncture with the outboard wall 55, provision should be made for drainage from the outboard chamber 52 of water which might collect therein. For this reason, a small opening is provided through the bottom wall 56 at its juncture with the outboard wall 55, and into this opening is connected a tube 77 which leads overboard through an opening 79 in the fairing skin 42. Similar provisions, including a tube 78 and skin opening 80, are provided for drainage of the inboard chamber 53.

A tubular blast diffuser 81 (Figure 3), of the general type often used for recoil compensation on shotguns and rifles, is mounted on the muzzle end of the gun barrel 49A in the aft portion of the outboard deflection chamber 52. Projectiles and all of the blast gases from the barrel 49A pass through the diffuser 81 into the deflection chamber 52. The blast diffuser 81 is further described in later paragraphs.

From the foregoing, it may be seen that the outboard blast gas deflecting chamber 52 receives blast gases through the diffuser 81 from the gun barrel 49A, that projectiles from the gun must pass through the blast diffuser 81 and chamber 52 and out the coupling tube 74, and that blast gases may freely leave the chamber 52 through the outboard-side openings 31A, 32A, 33A. The inboard, outboard, bottom, and end walls 54—58 effect a gas-tight seal between the interior of the gun compartment 47 and the interior of the chamber 52; blast gases which pass through the coupling tube 74 are all delivered from the latter into a blast tube 37A (described in later paragraphs); hence, no blast gases may enter the gun compartment 47 from the outboard deflection chamber 52, and all gases received by the chamber 52 from the gun barrel 49, excepting the small amount which may flow overboard through the drain tube 77, must pass overboard through the outboard-side openings 31A, 32A, 33A or pass out through the coupling tube 74. Both as to its component materials and as to the means and methods by which its parts are fastened together, the deflection chamber 52 must be of a construction capable of withstanding the relatively high pressures and temperatures imposed upon it by the blast gases.

Referring now to Figure 3, parts of the outboard blast deflecting chamber 52 will be further described. The adapter tube 76 is cylindrical, is aligned with the barrel 49A, and preferably extends slightly forward of the aft wall 58, in whose opening 75 the tube 76 is mounted. At its aft end, the adapter tube 76 has an encircling flange 82. The inner and outer diameters of the adapter tube 76 are concentric.

An adjustable seal assembly 85 consisting of an outer eccentric 86, inner eccentric 87, ring 88, and circular clamp 89 is used in association with the adapter tube 76. The outer eccentric 86 has cylindrical, eccentric outer and inner surfaces, fits snugly and rotatably into the bore of the adapter tube 76, and bears around its aft end an annular, flat-faced flange 92 which seats against the aft face of the adapter tube flange 82. The inner eccentric 87 has a cylindrical outer surface, fits snugly and rotatably into the outer eccentric bore, has an eccentric, convergent-divergent bore, and is encircled at its aft end by a flat-faced flange 95 which bears against the outer eccentric flange 92. The bore of the inner eccentric has a close, snug, sliding fit about the gun barrel 49A. The ring 88 is circular, has an outside diameter equal to that of the adapter tube flange 82, an inside diameter slightly larger than of the gun barrel 49, and fits against the aft face of the inner eccentric flange 95. The clamp 89 is of a circular type and is provided with a swinging bolt and nut (not shown) for tightening the clamp 89 around the circumferences of the tube flange 82 and ring 88, thus effecting a gas-tight seal between matching faces of the parts of the seal assembly 85 which prevents any flow between them of blast gases from out of the deflection chamber 52. The close fit between the inner eccentric bore 94 and the gun barrel 49A obviates the passage of any significant quantity of gases therebetween.

By loosening the clamp 89, the eccentrics 86, 87 may be rotated to any position necessary to allow for re-positionings of the gun barrel 49A relative to the airplane centerline which may be found needful when the barrel is boresighted. When the boresighting operation has been completed, the clamp 89 is retightened to lock the eccentrics 86, 87 in the positions into which they have been adjusted. "Whipping" or vibratory radial movement of the muzzle end of the barrel 49A is apt to occur, as in any rapid-fire gun, and this "whipping" is much to the detriment of the accuracy of the gun barrel 49A. In addition to their function of adjustably sealing the entry of the barrel 49A into the deflection chamber 52, the adapter tube 76 and seal assembly 85 effect rigid attachment of the forward end of the barrel 49A to the deflection chamber 52, which in turn is rigidly mounted in the gun compartment 47, and thereby provide much valuable aid in damping any "whipping" of the barrel 49A, thus adding measurably to the accuracy of the gun.

The coupling tube 74 is of cylindrical form, bears around its forward end an annular thickening or bulbous outward enlargement 100 of its wall, and extends forwardly through the deflection chamber forward wall 57 out of the chamber 52. The enlargement 100 is preferably spherical about a center lying on the longitudinal central axis of the coupling tube 74.

A guide plate 101 extends across the deflection chamber 52 just aft of the aft cross-piece 63. The guide plate 101 is rigidly attached at respective ends thereof to the inboard and outboard walls 54, 55; along its outer edge 102 is rigidly attached to the aft cross-piece 63, with which it lies flush, and slants rearwardly from its inner to its outer edge 102. The inner edge of the guide plate 101 closely approaches the blast diffuser 81 and lies between the forward end of the diffuser and the first row of openings 104 through the diffuser wall. To increase its ability to withstand the sharp impact forces imposed upon its aft side by blast gases, the guide plate 101 is of arcuate shape in that it bows forwardly between its ends attached to the inboard and outboard walls 54, 55, as may best be seen in Figure 2.

With continued reference to Figure 3, the chamber 52 is provided with two deflector plates 107, 108 of mutually similar form and function. The aft deflector plate 107 is located between the forward and aft cross-pieces 63, 64 and extends across the approximate middle of the chamber's middle outboard-side opening 32A. As viewed from front or rear, the plate 107 is of rectangular form and is rigidly attached at its inboard and outboard ends to the inboard and outboard walls 54, 55. The plate 107 preferably extends straight across the chamber 52, and its outer edge 109 is flush with the outboard and inboard flanges 60, 59 (Figure 2). The plate 107 has two angular bends 110, 111 (Figure 3) which divide it into three distinct legs or faces 112, 113, 114 and make it of inwardly recessed contour on its aft side and of outwardly bulged contour on its forward side. From its outer edge 109, the outer leg 112 slants forwardly and inwardly into the chamber 52; the middle leg 113 extends inwardly and is conveniently made to lie normal to the lengthwise axis of the chamber 52; and the inner leg 114 extends still further into the chamber 52 and slants somewhat rearwardly.

The forward deflector plate 108 is similar in all important respects to the aft plate 107 except that it is located at the extreme forward end of the outboard-side middle opening 32A; at its outer edge 117, its forward face lies against and is rigidly attached to the aft edge of the forward cross-piece 64, with which it lies flush. To prevent the pocketing of blast gases between the forward deflector plate 108 and the inner surface of the forward cross-piece 64, it is helpful to fair the plate 108 to the forward edge of the cross-piece 64. This is accomplished by bridging the gap between the plate 108 and the cross-piece forward edge with a rectangular plate 118 attached at its ends to the outboard and inboard walls 54, 55, at its inner edge to the inner end of the plate's outer leg 112, and at its outer edge to the cross-piece 64 at the forward edge of the latter.

Figure 4:
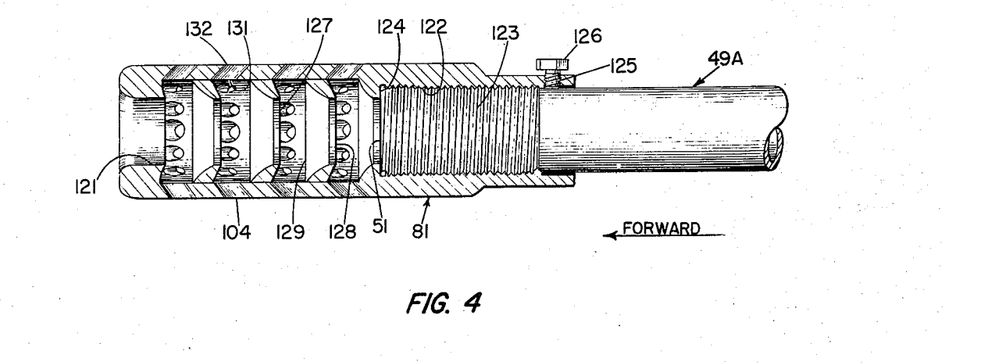
Figure 4 is a longitudinal median sectional view of the blast diffuser taken along the line IV—IV of Figure 3.

Referring now to Figure 4, the blast diffuser 81 is a tubular member with a bore 121 having, in its aft end portion, threads 122 which engage matching threads 123 on the gun barrel 49A, the muzzle end 51 of which butts against an annular shoulder 124 formed in the bore 121. Near its aft end, the diffuser wall 81 has a threaded radial hole 125 into which is threaded a set screw 126 that, when tightened, bears against the gun barrel 49A and locks the diffuser 81 thereon. Forward of the barrel 49A, the diffuser 81 is provided with a series of longitudinally spaced annular baffles 127 continuous at their outer peripheries 129 with the diffuser wall 81 and having central openings 128 that are concentric with the centerline of the barrel 49A and large enough to provide clearance for projectiles fired from the barrel. Each of the annular baffles 127 slants rearwardly, with the result that its central opening 128 lies somewhat aft of its outer periphery 129. Rows of openings 104, each of which openings is slanted so that its inner end 131 lies somewhat forward of its outer end 132, are formed in the diffuser wall 81 between the baffles 127.

Referring again to Figure 3, the outboard blast tube 37A comprises a cylindrical portion 133, a trough portion 134, a mouth portion 135, the latter being crossed by a pair of deflector plates 136, 137, and upper and lower fairing portions 138, 139. The cylindrical portion 133 extends through a clearance opening 164 provided in the forward former 46, and at its aft end has a bulbous, hollow enlargement 150 complementary to and fitting over the enlargement 100 of the coupling tube 74, to which the cylindrical portion 133 is attached by a circular clamp 83. The cylindrical portion 133, trough portion 134, mouth 135, and fairings 138, 139 are integrally formed or are strongly joined together as by welding. The materials of which the blast tube 37A is constructed must be capable of withstanding the shocks and temperatures imposed upon the blast tube by the gun blast gases. The semi-cylindrical trough 134 is open along its side lying farthest removed from the engine air duct 25A (reference being made also to Figure 2), extends from the cylindrical portion 133 to the inlet lip forward edge 26, of which edge 26 the blast tube forward edge forms a part 140, and with the cylindrical portion 133 is aligned with the barrel 49A. The mouth 135 is of flared construction, extends from the cylindrical portion 133 to the blast tube forward edge 140; has a generally oval opening 141 lying flush with the contour of the duct fairing skin 42, and vents the trough 134 and cylindrical portion 133 to the atmosphere above and outboard of the engine air duct 25A. The upper fairing 138 conforms to the contour of and lies flush with the duct fairing skin 42. The lower fairing 139 extends downwardly and rearwardly into the duct 25A, forms, at its juncture with the trough 134 and upper fairing 138, the blast tube forward edge 140, and fairs the blast tube 37A into the air duct outboard wall 41. The longitudinal centerline of the cylindrical portion 133 and trough 134 passes through the approximate thickness-wise center of the lip edge contour 26; hence, at the forward end of the trough, the lip edge portion 145 is arcuate and extends slightly into the air duct 25A.

Particular reference is now made to Figure 3. The flared shape of the mouth 135 is achieved by introducing into its contour a series of beveled surfaces 146, 147, 148. From the cylindrical portion 133, the aft wall of the mouth 135 angles outwardly and forwardly to form a first beveled surface 146 whose inner borderline or edge 149 begins at the upper side of the cylindrical portion 133 and proceeds forwardly and inwardly therefrom around the inboard side of the cylindrical portion 133 and terminates at the upper edge 153 of the trough 134 at the forward end of the latter. The inner edge (not shown) of the first bevel follows a similar course around the outboard side (not shown) of the cylindrical portion 133. A second bevel 147 which adjoins and overlies the first bevel 146 extends straight outwardly from the trough 134. Its inner edge 154 is identical with the outer edge of the first bevel 146 and intersects the trough upper edge 153 near the forward end thereof. A third, outermost bevelled surface 148 extends from the outer edge 155 of the second bevel 147 to the upper fairing 138 and, at its point of origin in the aft wall of the mouth 135, extends outwardly and aft. The third bevel outer edge 141 lies at the intersection of the bevel 148 with the upper fairing 138 and defines the outer periphery of the blast tube mouth 135.

The aft deflector plate 136, as may be seen in Figure 2, extends across the blast tube mouth 135 and is attached at its inboard and outboard ends 157, 158 to the inboard and outboard sides of the mouth 135. Of arcuate shape, the deflector 136 bows forwardly between its ends 157, 158 at which ends its outer edge lies approximately flush with the upper fairing 138. The inboard end 157 is preferably located slightly aft of the outboard end 158 to deflect outwardly as well as upwardly the gases leaving the mouth 135. From its ends 157, 158, the deflector plate outer edge may curve outwardly to its approximate middle, thus (refer to Figure 3) causing the outer edge to extend above the level of the upper fairing 138. The deflector inner edge lies slightly aft of the outer edge between which edges the plate is dished forwardly, as may best be seen in Figure 3, and the inner edge is bowed outwardly to provide projectile clearance. A forward deflector plate 137 which is similar in all important respects to the aft plate 136 is located between the latter and the blast tube forward edge 140.

With joint reference to Figures 2 and 3, the upper and lower fairings 138, 139, which occupy a cut-out 161 made for them in the duct fairing skin 42 and the duct outboard wall 41, fair the blast tube 37A to the duct wall 41 and duct fairing skin 42 and are attached thereto by splice plates 162, 163 and suitable fasteners, thus affording a means of rigidly mounting the blast tube 37A in the airplane.

The foregoing descriptions of the left-hand outboard gun's blast deflection chamber 52, blast diffuser 81, and blast tube 37A, with certain exceptions which will now be noted, also apply in all important respects to the corresponding blast deflection means components provided for the left-hand inboard and right-hand inboard and outboard guns, each of those guns being similarly provided with a deflection chamber, blast diffuser, and blast tube. The left-hand outboard chamber 52, as stated, opens outwardly at an angle of about 45 degrees to the vertical; the left-hand inboard chamber 53 also opens outwardly at an angle away from the vertical, but because the inboard chamber is located where the downward and outward slant of the duct fairing skin 42 is less precipitous than it is in the location occupied by the outboard chamber 52, the inboard chamber openings' outward slant is less than that of the outboard chamber openings. A similar distinction may be made between the openings of the left-hand inboard and outboard blast tubes 37A, 38A. The right-hand outboard and inboard deflection chambers and blast tubes are the opposite-handed counterparts of the corresponding left-hand items described above.

Referring briefly to Figure 2, the timing means components may conveniently be housed in one container such as the box-like case 39 installed by any appropriate means on fixed structure 130 within the fuselage 22. The components of a preferred timing means and their connections between themselves and other components of the fire control system as well as with the guns will now be described.

Figure 5:
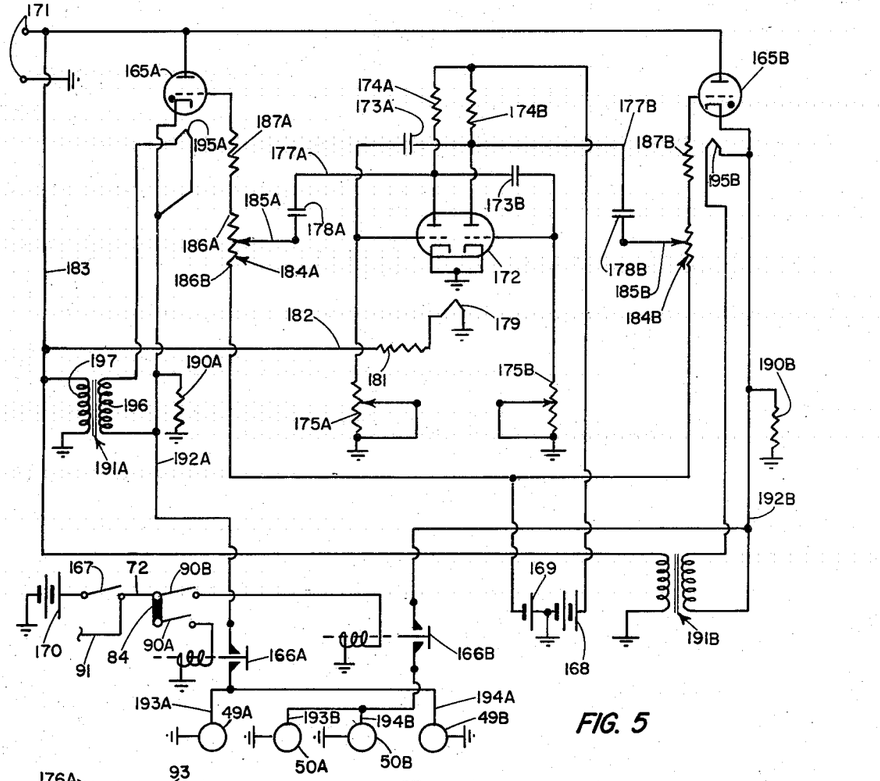
Figure 5 is a schematic diagram showing the electrical parts and connections of the blast timing means and the mode of connection of the timing means to the armament units of the aircraft.

A dependable, stable, highly accurate, and relatively very durable timing means comprises a multivibrator circuit feeding rectangular waves of alternating polarities to a pair of differentiation networks which produce desired alterations in the waves and in turn feed them into a pair of thyratron circuits, the altered waves being of such polarities, form, and timing that two tubes of the thyratron circuits are caused to fire in alternation and at regular intervals. With reference to Figure 5, the output of one of the thyratron tubes 165A is supplied through an outboard gun-firing relay 166A to the left- and right-hand outboard guns 49A, 49B, while the inboard guns 50A, 50B receive the output of the other thyratron tube 165B through an inboard gun-firing relay 166B. The two gun-firing relays 166A, 166B are controlled by electrical power delivered to them through the pilot's trigger switch 167 and a pair of gun selector switches 90A, 90B. The multivibrator circuit receives electrical power from a first D.-C. power source 168, while a second D.-C. power source 169 supplies a negative bias to the grids of the thyratron tubes 165A, 165B. A.-C. power is supplied to the thyratron tubes 165A, 165B by an A.-C. power source 171 provided in the airplane.

The basic timing circuit of the timing means is the free-running multivibrator circuit. Comprising, in the example, a dual triode tube 172, two capacitors 173A, 173B, two fixed resistors 174A, 174B, and a pair of variable resistors 175A, 175B, the multivibrator circuit components are interconnected in a well-known manner which will be familiar to those skilled in the art, and which therefore requires no detailed description herein. The operating frequency of the multivibrator circuit is determined by the variable resistors 175A, 175B in conjunction with the capacitors 173A, 173B. The variable resistors 175A, 175B constitute means for regulating the charge and discharge rate of the two capacitors 173A, 173B and therefore for balancing and adjusting the frequency of the multivibrator output, this output consisting of two simultaneously emitted trains of square waves 176A, 176B (Figure 6), one of which is fed through an electrical lead 177A into the capacitor 178A of a first differentiation circuit (to be described) for the outboard guns 49A, 49B, and the other of which is supplied through another lead 177B to the capacitor 178B of a second differentiation circuit serving a role in the timing of the inboard guns 50A, 50B. The two wave trains 176A, 176B, whose respective simultaneously occurring waves are 180 degrees out of phase with each other, are identical except for their phase difference. The resistance values in the multivibrator circuit, in any particular application, should be such as to render the multivibrator frequency adjustable throughout the range of firing rates which may be desired in the guns which the timing means controls; a modest range of adjustment of the multivibrator frequency about a rate corresponding to the maximum firing rate of the guns will be adequate in most applications. For frequency stability, the D.-C. voltage furnished by the power supply 168 to the plates of the dual triode tube 172 should be constant. The multivibrator circuit dual triode tube 172 has a grounded heater element 179 supplied with proper voltage through a resistor 181 connected to the A.-C. power source 171 by two leads 182, 183. Although for convenience drawn as if outside the tube 172, the heater element 179 of course is included in the envelope of the tube 172.

Figure 6:
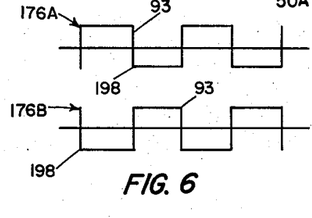
Figure 6 is a graph showing the wave form of the two output voltages of the multivibrator circuit.
Figure 7:
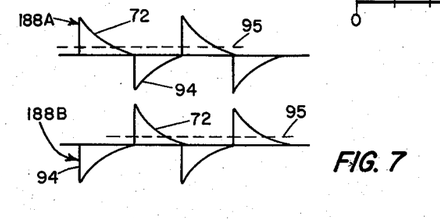
Figure 7 is a graph showing the wave form of the differentiation circuit outputs.

The differentiation network for the outboard guns 49A, 49B includes the capacitor 178A, connected as described to the multivibrator circuit for receiving the wave train 176A emitted by the latter, and further includes a variable resistor 184A whose wiper 185A is connected to the capacitor 178A and whose two ends 186B, 186A are respectively connected to the negative side of the second D.-C. power source 169 and, through a fixed isolating resistor 187A, to the grid of the thyratron tube 165A. The differentiation network for the inboard guns 50A, 50B similarly includes a capacitor 178B and variable resistor 184B having connections exactly corresponding to those of the outboard-guns differentiation circuit. The differentiation networks receive the rectangular wave outputs 176A, 176B of the multivibrator circuit and convert them, as measured across the variable restances, into distinctly differentiated waves 188A, 188B (Figure 7) having initial voltage peaks followed by uniform and relatively pronounced voltage decay. Thus, the rectangular waves 176A shown at the top of Figure 6 are converted by the capacitor 178A and variable resistance 184A of the outboard-gun differentiation network into the differentiated waves 188A, and the latter are fed through the fixed resistor 187A (Figure 5) to the grid of the outboard-gun thyratron tube 165A. Meanwhile, the lower rectangular waves 176B of Figure 6 are modified to form the lower differentiated waves 188B of Figure 7, and the latter are applied through the fixed resistor 187B (Figure 5) to the grid of the inboard-gun thyratron tube 165B. As will be more fully explained, the decay slope of the differentiated waves 188A, 188B determines the periods of conduction of the thyratron tubes 165A, 165B and hence the "on" time of each application by the tubes of firing voltage to the guns. As the resistance 184A controls the discharge rate of its associated capacitor 178A, the decay slope of the differentiated waves 188A delivered to the thyratron tube 165A for the outboard guns may be varied at will by adjusting the variable resistance 184A in the outboard-guns differentiation network. The variable resistance 184B in the other differentiation network similarly provides means for adjusting the decay slope of the differentiated waves 188B delivered to the inboard-guns thyratron tube 165B.

The thyratron circuits receive the peaked-wave outputs 188A, 188B of the two differentiation circuits and in response thereto produce a pair of intermittent, pulsating D.-C., gun-firing voltage outputs containing pulse-groups 189A, 189B (Figure 8) which are identical except that, in the case of each output, the "on" time of a respective output always occurs during the "off" time of the other output. The voltage of the single-phase A.-C. power source 171 provided in the airplane to supply electrical power to the thyratron circuit should be suited to the characteristics of the particular thyratron tubes 165A, 165B chosen for use in the circuit, and must be high enough to enable the tubes to produce pulse groups 189A, 189B of adequately high gun-firing voltage. The frequency of the A.-C. power source 171 should preferably be such that a plurality of D.-C. pulsations (for example, six to ten pulsations) are included in each "on" interval or pulse-group 189A, 189B. The thyratron circuits comprise an outboard-gun output circuit (including a thyratron tube 165A, an isolating resistor 187A, a line capacitance bleeding resistor 190A, and a cathode heater transformer 191A), and an inboard-gun output circuit (comprising a thyratron tube 165B similarly associated with an isolating resistor 187B, heater transformer 191B, and capacitance-bleeding resistor 190B).

The cathode of the outboard-gun output circuit's thyratron tube 165A is connected through an output lead 192A, outboard gun selector relay 166A, and a pair of gun leads 193A, 194A with the two outboard guns 49A, 49B, and, through the electrically fired ammunition of the guns, with ground. The plate of this tube 165A is connected to one side of the A.-C. power source 171, the other side of the power source 171 being grounded; its grid is connected through the isolating resistor 187A to the differentiation network variable resistor 184A, and through the latter resistor to the negative side of the second D.-C. voltage source 169, the positive side of this voltage source being connected to ground, thus placing a necessary negative bias on the grid.

The line capacitance bleeding resistor 190A connects the output lead 192A to ground; its resistance value should be quite high so that it will not short out, to any appreciable extent, the pulse-group output of the tube 165A, but should at the same time be low enough to bleed off any capacitance charges which might arise between the output lead 192A, the two gun leads 193A, 194A, or the guns 49A, 49B etc., and the airframe, which charges, if they are allowed to build up, would place positive charges on the cathodes of the tubes 165A, 165B which would make the grids of those tubes more than normally negative in relation to the cathodes, and would thus constitute a possible cause of erroneous indications of electrical output at the gun ends of the leads 193A, 193B, 194A, 194B during any checking or testing operations conducted thereat.

The isolating resistor 187A permits the passage of the differentiation circuit waves 188A from the variable resistor 184A to the grid of the thyratron tube 165A, but prevents thyratron tube grid potentials, which vary widely during operation of the thyratron tube, from disturbing the operation of the multivibrator circuit through being fed to the latter through the variable resistor 184A and the capacitor 178A of the differentiation circuit.

For clarity of presentation, the cathode heater element 195A is shown, in the drawing, as if it were outside the thyratron tube 165A. The cathode heater element 195A is of course within the tube envelope, and in most tubes is near enough to the cathode to be sure of receiving an arc from the latter if a large voltage differential were to occur between the cathode and the heater 195A. To prevent such an occurrence, the heater 195A is connected to the output line 192A and to one end of the secondary winding 196 of the heater voltage transformer 191A, and the other end of the secondary winding 196 also is connected to the output line 192A. As the output line 192A is connected to the cathode, heater voltage changes with cathode voltage, and no large voltage differential can appear between them. The heater transformer primary winding 197 is connected, through a lead 183 and a ground connection, across the A.-C. power source 171. The heater transformer 191A steps the A.-C. power source voltage down to the relatively low voltage utilized by the heater element 195A.

The connections of the previously enumerated components of the inboard-gun output circuit correspond in all details to those of the outboard-gun output circuit explained above; accordingly, no detailed description of the inboard-gun output circuit will be required for an understanding of the same, it being sufficient to point out that its gun-firing output voltage 189B is supplied through its output lead 192B to the inboard-gun selector relay 166B.

The trigger switch 167, located where readily accessible to the pilot, as on the pilot's control stick, connects a third source of D.-C. power 170 through a lead 72 to a bus 84 to which are connected an inboard gun selector switch 90B and an outboard gun selector switch 90A, these switches in turn being connected respectively to the winding of the inboard gun selector relay 166B and outboard gun selector relay 166A. With the outboard-gun selector switch 90A closed, closing the trigger switch 167 implements energization and closing of the outboard- gun selector relay 166A, thus connecting the outboard-gun firing voltage pulse group output lead 192A through the relay 166A and two gun leads 193A, 194A to the two outboard guns 49A, 49B. With the inboard-gun selector switch 90B and trigger switch 167 closed, the inboard guns 50A, 50B are similarly connected through two gun leads 193B, 194B and the inboard gun selector relay 166B to the inboard-gun output circuit lead 192B. Closing both gun selector switches 90A, 90B and the trigger switch 167 effects the connection of the outboard guns 49A, 49B to their associated firing voltage output lead 192A, and the inboard guns 50A, 50B to their corresponding output lead 192B. The trigger switch 167, in most aircraft, is associated with other gunfire control elements not shown or discussed herein because not directly pertinent to the present invention; the lead 91 shown as cut away represents a means of connecting the trigger switch 167 to such other elements.

When a particular gun of the aircraft is fired, for instance the left-hand outboard gun 49A (Figure 2), the blast-deflecting means effects progressive, controlled release of the blast gases discharged from the gun and thereby, by directing them in flow-paths leading radially away from their original direction and by reducing their density, renders them incapable, when not excessively reinformed by simultaneous blasts from another gun, of having harmful effects on the airframe components and accessories or on the parts and performance of the power plant of the aircraft in which the gun is installed. The gases of a particular blast are travelling directly along the line of fire toward the forward end of the blast diffuser 81 (Figure 3) when they pass from the muzzle of the gun barrel 49A into the diffuser. Forward of the muzzle, rapid radial expansion of the blast gases about their flow axis is effected within the diffuser 81 by the rearwardly slanted annular baffles 127 (Figure 4), and the radially expanded gases are released into the deflection chamber 52

(Figures 2, 3) through the diffuser wall openings 104. As these openings 104 slant rearwardly, the blast gases have considerable rearward motion when they leave the blast diffuser 81 through the wall openings 104. Not all the blast gases undergo sufficient radial expansion to leave the diffuser through the slanted openings 104; a certain portion continue to move along the original flow direction and pass into the deflection chamber through the forward-end projectile-clearance opening 121 (Figure 4).

Most of the gases discharged into the deflection chamber 52 (Figures 2 and 3) through the diffuser wall openings 104 are released from the aircraft into the atmosphere through the deflection chamber aft opening 31A. Rearward velocity is imposed on the departing gases by the rearwardly slanted guide plate 101, and outward and upward velocities are added by the rear wall 58 and the outwardly slanted inboard and outboard walls 54, 55.

The blast gases discharged into the deflection chamber 52 through the blast diffuser end opening 121, accompanied by gases discharged through the diffuser wall openings 104 flowing forward through the gap existing between the guide plate 101 and lower wall 56, expand laterally as they pass forward through the chamber, and a considerable portion is caught by the flat sides of the deflector plates 107, 108 and guided by those plates, in the conjunction with the inboard and outboard walls, 54, 55, out of the chamber's middle opening 32A in an upward, outward, rearward direction. Deflection of the blast gases away from their original flow axis and out of the middle and forward openings 32A, 33A is also effected by the forward faces of the forward and aft deflector plates 107, 108; at its peripheral margin adjacent the lower edges of the deflector plates 107, 108, the stream of gases passing forwardly at high speed through the chamber exhibits behavior exemplifying the so-called Coanda effect in that the gases flowing adjacent the plates 107, 108 follow the flat planes and bends of the forward faces of the plates 107, 108, induce a considerable volume of the remainder of the high-speed stream to join their deflected flow-direction, and are released outwardly and upwardly from the aircraft through the middle and forward openings 32A, 33A. Rearward direction is imparted by the outboard legs of the forward deflector plates 107, 108 to gases leaving the chamber through the middle opening 32A. As they have experienced much reduction in density and momentum, the gases released outwardly and upwardly through the forward opening 33A are readily carried rearwardly away from the duct inlet opening by the airstream accompanying forward flight of the aircraft.

Thus, as explained above, large volumes of the blast gases explosively discharged from the gun barrel 49A are progressively deflected from the blast jet by the blast diffuser 81 and forward and aft deflector plates 107, 108, and are released from the aircraft through the forward, middle, and aft openings 33A, 32A, 31A in an outward and upward direction away from the aircraft, rearward velocity also being imparted to the gases by the blast diffuser wall openings 104, the guide plate 101, and the deflector plates 107, 108. Consequently, the quantity of gas which is left to pass out of the chamber 52 through the coupling tube 74 into the blast tube 37A is drastically reduced below the quantity which originally was discharged from the gun barrel 49A.

All of this residual quantity of blast gases must pass through the blast tube cylindrical portion 133; but comparatively little leaves the blast tube 37A along the original flow axis of the blast jet. Instead, as shown in Figure 3, the gases encounter, at the blast tube mouth 135, the beveled surfaces 146, 147, 148 which, by angular steps, induce them, in accordance with the Coanda effect, and aided by the deflector plates 136, 137, to flow radially away from the original flow axis, and upwardly, outwardly, and rearwardly away from the duct inlet opening and the airplane.

The preceding description of the operation of the deflection chamber and blast tube of the blast-deflecting means for the left-hand outboard gun applies also to the operation of the deflection chamber and blast tube of the left-hand inboard gun and of the right-hand inboard and outboard guns, whose operation consequently will not be described in detail.

The blast-deflecting means thus effect a controlled release at lowered intensity of the gases of individual gun blasts and prevent any blast itself from having intensity enough to produce any of the deleterious effects already described. Experience, however, has shown that in many aircraft, even at such lowered intensity, two simultaneously occurring blasts may cause compressor stall, damage to air-frame and engine components, etc.; consequently, in such cases, time-wise control of the gun blasts is needed in cooperation with the blast-deflecting means in order to apportion the discharge of blasts into the chambers in such sequence and timing as to prevent the simultaneous occurrence of blasts which, because of their points of origin, could reinforce each other. This necessary time-wise control is provided by the blast-timing means, the operation of which will now be explained.

As previously stated, the multivibrator circuit is the basic timing unit of the blast timing means, its function being to produce symmetrical rectangular waves which, after modification by the differentiation circuits, are supplied to the control grids of the tubes of the thyratron circuits. With reference to Figures 5–8, the thyratron tubes 165A, 165B serve as electronic valves which, in response to the differentiated waves 188A, 188B imposed upon their grids, allow the passage of electrical power from the A.-C. power source 171 to the guns 49A, 49B, 50A, 50B when the gun selector switches 90A, 90B and trigger switch 167 are closed, firing voltage pulse groups 189A, 189B being imposed upon the firing mechanisms of the guns at intervals corresponding to the timing of the multivibrator outputs 176A, 176B, this timing being such that the two inboard guns 50A, 50B fire together in alternation with unisonal firing of the two outboard guns 49A, 49B.

By varying the settings of the two frequency-adjusting resistors 175A, 175B, the frequency of the outboard gun regulating output 176A of the multivibrator circuit is made such that rectangular, positive pulses 93 occur in that output at the rate at which the outboard guns are to fire together, which rate may well be the maximum firing rate of those guns; while in the inboard gun regulating output 176B, positive pulses 93 are made to occur at the same rate, but during the times of the negative pulses 193 of the first output. The outboard guns fire each time a positive pulse 93 occurs in the outboard-gun controlling output 176A, and the inboard guns similarly fire at the time of each positive pulse 93 of the other multivibrator output 176B. With positive pulses 93 occurring in each output 176A, 176B at the rate and times specified, it being assumed that all four guns have substantially the same maximum firing rate, each of the guns is made to fire at the highest rate of which it is capable, the outboard guns 49A, 49B fire during the intervals in which the inboard guns 50A, 50B are silent, and the over-all frequency of discharge of projectiles from the four guns together is double the maximum firing rate of any gun fired alone. The timing means thus does not slow any gun, but instead, in the present example, doubles the frequency at which projectiles are fired from the four guns.

The two rectangular wave outputs 176A, 176B of the multivibrator circuit are applied, as previously described, to the capacitors 178A, 178B of the two identical differentiation networks. Because of the time constant offered by the resistance-capacitance combination of each of these networks to the received rectangular waves 176A, 176B, the differentiation network outputs 188A, 188B consist of trains of peaked voltage pulses 72, 94 which provide the means to trigger the two thyratron tubes 165A, 165B to fire out of phase. The decay slope of the positive pulses 72 determines the length of the period of conduction of the thyratron tubes 165A, 165B. The period of conduction of the outboard-gun regulating tube 165A may be adjusted by adjusting the variable resistor 184A which controls the decay slope of the outboard-gun controlling output waves 72 (Figure 7), and the period of conduction of the inboard-gun regulating tube 165B may similarly be varied by adjusting the other variable resistor 184B.

Figure 8:
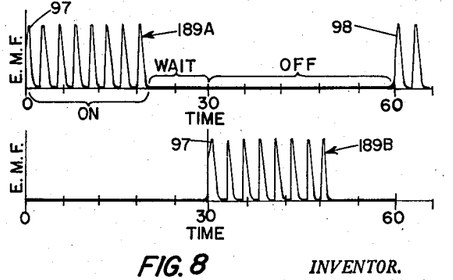
Figure 8 is a graph showing the electrical nature and timing of the thyratron circuit output voltages.

The outputs 189A, 189B of the two thyratron tubes 165A, 165B, one output 189A for the outboard guns 49A, 49B and one output 189B for the inboard guns 50A, 50B, are identical except that they operate out of phase. The A.-C. voltage source 171 supplies voltage to the plates of the thyratrons 165A, 165B which, normally biased below triggering voltage by the second D.-C. power source 169, fire on the positive half cycles of plate voltage during the times when the positive pulses 72 furnished by the differentiation networks hold the thyratron grids above the triggering voltage necessary for firing of the tubes. Thus, at the high-voltage beginning of a particular positive pulse 72, the tube 165A or 165B to whose grid the pulse is delivered commences firing on a positive half-cycle of plate voltage, continues to fire on each positive half-cycle applied to its plate as long as its grid is kept above the triggering voltage, and ceases to fire during each plate voltage negative half-cycle. When the positive pulse 72 has decayed below the triggering voltage level, however, this level being illustrated by the dotted line 95, the tube cuts off at the end of a plate voltage positive half-cycle, and does not fire again during the part of the positive wave 72 having voltages lying below that represented by the dotted line 95 nor during the entire time-span of the next-succeeding, negative wave 94. Thus where, for example, a differentiated wave 72 or 94 endures for an interval of thirty time units (for instance, 30 microseconds), the length of any one firing cycle of the corresponding thyratron tube output, as shown in Figure 8, is the span of a positive wave 72 plus the time of the succeeding negative wave 94, or 60 microseconds. The firing cycle is thus divided into two 30-microsecond halves, the first half being contemporaneous with the positive differentiated pulse 72 and the second with the next-following negative pulse 94. The portion of the firing cycle occurring during the part of the positive differentiated peaked wave 72 standing above the thyratron minimum triggering voltage 95 occupies, in the example, approximately 20 microseconds, or about two-thirds of the firing cycle first half, and consists of a train 189A or 189B of voltage pulses 97 with steep wave fronts well adapted for firing the primers of electrically fired ammunition; this is the "on" period of the cycle. The balance of the cycle first half is what is herein termed a "wait" period; the thyratron 165A or 165B does not fire during this period nor during the ensuing "off" period. The "off" period fills the entire second half of the cycle.

The thyratron output 189A shown at the top of Figure 8 is supplied to the outboard guns 49A, 49B and the other output 189B shown is supplied to the inboard guns 50A, 50B. Note that the first half of the outboard-gun firing cycle containing the "on" period and "wait" period corresponding to a positive differentiated wave 72 is contemporaneous with the second half ("off" period), corresponding to a negative wave 94, of an inboard-gun firing cycle. Immediately after the outboard-gun "wait" period, the inboard-gun output 189B initiates a firing cycle beginning with an "on" period followed by a "wait" period during which periods the outboard-gun cycle has its "off" period. At the conclusion of the inboard-gun "wait" period, the outboard-gun output begins a new cycle starting with an "on" period 98. As long as the gun selector switches 90A, 90B and the trigger switch 167 are closed, the thyratron tubes 165A, 165B continue to produce outputs 189A, 189B whose "on," "wait," and "off" periods manifest the relations and order just described.

When a group of firing voltage waves such as 189A is delivered to the primer of a round of ammunition of one of the guns, say the left-hand outboard gun 49A, the primer ordinarily fires during the steep voltage rise of the first wave 97. As is sometimes the case, however, the primer may not fire during the voltage rise of the first wave 97. In previously used gunfiring systems utilizing a single sharp voltage rise, such as obtained from the discharge of a condenser, for the firing of each projectile, such failure of a primer to fire puts the particular gun out of operation util a manual or mechanical operation can be performed which removes the round containing the unfired primer from the gun. The groups 189A, 189B of firing voltage waves 97 of the present invention are very effective in eliminating such unfired rounds, however; experience has shown that the majority of rounds which fail to fire on the first wave 97 will do so on one of the succeeding waves of the firing cycle "on" period.

The importance of the firing cycle "wait" periods thus, in connection with the above, becomes apparent: the "wait" periods separate the end of an "on" period of one output 189A or 189B from the succeeding "on" period of the other output 189A or 189B and thus prevent a late-firing primer from discharging a projectile so late in a cycle of one pair 49A, 49B or 50A, 50B of guns as to coincide nearly or exactly with the start of a firing cycle of the other pair of guns 49A, 49B or 50A, 50B. The length of the "off" periods is adjusted as desired by varying the differentiation circuit resistances 184A, 184B which control the decay slopes of the differentiated waves 72 and thus the periods of conduction of the thyratron tubes 165A, 165B. The number of voltage pulses 97 occurring in any one "on" period group 189A, 189B is equal to and determined by the number of cycles occurring during the same period in the A.-C. power source 171.

While only one embodiment of the invention has been shown in the accompanying drawings, it will be evident that various modifications are possible in the arrangement and construction of our blast-controlling means components without departing from the scope of the invention.

We claim:

1. For an aircraft having a propulsive jet engine and having armament units provided with projectile-discharging tubular members, blast-controlling means for maintaining at innocuous level atmospheric disturbances accompanying the discharge of projectiles from said armament units, said blast-controlling means being mounted in said aircraft and comprising: blast-deflecting means including chambers receiving gaseous blasts apportioned thereto by blast-timing means recited below and emitted from said armament units in association with projectiles discharged from the latter, said blast-deflecting means being operative for reducing the density and velocity of gases of said blasts and discharging some of said gases overboard in a direction leading away from their initial flow-direction; and blast-timing means apportioning individual ones of said blasts to individual ones of said chambers in an order wherein a substantial timewise interval separates the beginning of each of said blasts from the beginning of any other of said blasts likely, if occurring in substantial simultaneity therewith, to reinforce it and originate therewith an atmospheric disturbance of more than innocuous level, said blast-timing means including: a multivibrator circuit for producing electrical outputs characterized by regularly occurring rectangular voltage waves; differentiation networks for receiving said multivibrator circuit outputs and for converting the same into alternating-current outputs comprising distinctly differentiated positive and negative pulses, said differentiation networks each comprising a capacitor and a resistor; isolating resistors, each of the same being connected to a respective one of said resistors of said differentiation networks and receiving one of said alternating-current outputs therefrom; thyratron tubes each having a grid connected to a respective one of said isolating resistors, a cathode electrically connected with at least one of said armament units, and a plate receiving voltage from a source of alternating current in said aircraft, said thyratron tubes being responsive to said plate voltages and to said outputs for delivering direct-current projectile-firing pulse groups to said armament units during portions of positive pulses of said differentiation circuit outputs which hold said grids above the minimum triggering voltages of said thyratron tubes and for withholding projectile-firing pulse groups from said armament units during remaining portions of said positive pulses and during all of said negative pulses of said differentiation circuit outputs; and said blast-deflecting means including chambers, each one of said chambers having a first opening receiving blast gases from an associated one of said armament unit tubular members, a second, restricted opening aligned with said tubular member and said first opening and communicating with the atmosphere, said first and second openings affording clearance for projectiles discharged from said tubular member, and a third opening substantially flush with an exterior surface of said aircraft and lying between said first and second openings, some of said gases received into said chamber through said first opening being released overboard through said third opening in a direction leading away from the axis of said projectile-firing tubular member, whereby the atmospheric disturbances occasioned by the discharge of projectiles from said tubular members of said armament units are rendered harmless to the structure and operation of the aircraft and its jet engine.

2. Blast-controlling means of the type claimed in claim 1, said multivibrator circuit of said blast-timing means being provided with variable resistors operable for effecting frequency adjustment of said multivibrator circuit outputs, and said resistors of said differentiation networks of said blast-timing means being variable for effecting adjustment of the time-wise lengths of said direct-current projectile-firing pulse groups delivered to said armament units from said thyratron tubes.

3. For an aircraft having a propulsive jet engine and having armament units provided with projectile-discharging tubular members, blast-controlling means for maintaining at innocuous level atmospheric disturbances accompanying the discharge of projectiles from said armament units, said blast-controlling means being mounted in said aircraft and comprising: blast-deflecting means including chambers receiving gaseous blasts apportioned thereto by blast-timing means recited below and emitted from said armament units in association with projectiles discharged from the latter, said blast-deflecting means being operative for receiving gases of said blasts, reducing their density and velocity, and discharging some of said gases overboard in a direction leading away from their initial flow-direction; and blast-timing means apportioning individual ones of said blasts to individual ones of said chambers in an order wherein a substantial time-wise interval separates the beginning of each of said blasts from the beginning of any other of said blasts likely, if occurring in substantial simultaneity therewith, to reinforce it and originate therewith an atmospheric disturbance of more than innocuous level, said blast-timing means including: a multivibrator circuit for producing electrical outputs characterized by regularly occurring rectangular voltage waves and provided with variable resistors operable for effecting frequency adjustment of said multivibrator circuit outputs; differentiation networks for receiving said multivibrator circuit outputs and for converting the same into alternating-current outputs comprising distinctly differentiated positive and negative pulses, said differentiation networks each comprising a capacitor and a variable resistor, the latter being adjustable for varying voltage decay slopes of said pulses of said differentiation network outputs; isolating resistors, each of the same being connected to a respective one of said resistors of said differentiation networks and receiving one of said alternating-current outputs therefrom; thyratron tubes each having a grid connected to a respective one of said isolating resistors, a cathode electrically connected with at least one of said armament units, and a plate receiving voltages from a source of alternating current in said aircraft, said thyratron tubes being responsive to said plate voltages and to said differentiation circuit outputs for delivering direct-current projectile-firing pulse groups to said armament units during portions of said positive pulses of said differentiation circuit outputs which hold said grids above the minimum triggering voltages of said thyratron tubes and further being responsive to the same for withholding projectile-firing pulse groups from said armament units during remaining portions of said positive pulses and during all of said negative pulses of said differentiation circuit outputs, each of said thyratron tubes having a heater electrically connected to said cathode of said thyratron tube and to an end of a secondary winding of a separate transformer, said secondary winding being connected at its other end to said cathode of said thyratron tube; and said blast-deflecting means including: chambers, each having a first opening receiving blast gases from an associated one of said armament unit tubular members, a second, restricted opening aligned with said tubular member and said first opening and communicating with the atmosphere, said first and second openings affording clearance for projectiles discharged from said tubular member, and a third opening substantially flush with an exterior surface of said aircraft and lying between said first and second openings; and at each of said chambers a blast tube having an axis aligned with said first and second openings of said chamber and having a first opening communicating directly with the atmosphere and a second opening communicating with said second opening of said chamber, and whereby the atmospheric disturbances occasioned by the discharge of projectiles from said armament units are rendered harmless to the structure and operation of said aircraft and said jet engine.

4. Blast-controlling means of the type claimed in claim 3, each of said chambers receiving into its interior, through said first opening of said chamber, a muzzle-end portion of said one of said tubular members associated with said chamber, said blast deflecting means further comprising a tubular blast diffuser having a side wall, two open ends, and a plurality of openings in said side wall, a first one of said ends receiving said muzzle end of said armament unit tubular member and the second one of said ends of said diffuser being open to the interior of said chamber.

5. For an aircraft having a propulsive jet engine and having armament units provided with projectile-discharging tubular members, said armament units being adapted for firing in response to electrical currents delivered to said armament units, blast timing means for effecting the discharge at a controlled rate of projectiles from said armament units in a sequence wherein those of said armament units, the simultaneous firing of which could produce mutually reinforcing atmospheric disturbances, are constrained to fire in time-wise separation from each other, said blast timing means comprising: a multivibrator circuit for producing electrical outputs characterized by regularly occurring rectangular voltage waves; differentiation networks for receiving said multivibrator circuit outputs and for converting the same into differentiated outputs comprising alternate positive and negative pulses with initial voltage peaks and pronounced decay slopes, said differentiation networks each comprising a capacitor and a resistor; isolating resistors, each of the same being connected to a respective one of said resistors of said differentiation networks and receiving one of said differentiated outputs therefrom; thyratron tubes each having a grid receiving one of said differentiated outputs through a respective one of said isolating resistors, a cathode electrically connected with at least one of said armament units, and a plate receiving voltage from a source of alternating current in said aircraft, said thyratron tubes each having a minimum triggering voltage and being responsive to said plate voltages and to said differentiated outputs for delivering direct-current projectile-firing pulse groups to said armament units during periods when portions of said positive pulses of said differentiated outputs have sufficient voltage to raise said grids above the minimum triggering voltages of said thyratron tubes and for withholding projectile-firing pulse groups from said armament units during remaining portions of said positive pulses and during all of said negative pulses of said differentiated outputs, whereby the atmospheric disturbances occasioned by the discharge of projectiles from said armament units occur in substantial time-wise separation and are rendered harmless to the structure and operation of said aircraft and said jet engine.

6. Blast timing means of the type claimed in claim 5, alternating current being supplied to said plate at a frequency substantially higher than the frequency of each of said multibrator circuit outputs and said projectile-firing pulse-groups consisting of trains of direct-current pulses, each of said pulses being characterized by an initial steep voltage rise.

7. Blast-timing means of the type claimed in claim 5, each of said thyratron tubes having a heater electrically connected to said cathode of said thyratron tube and to an end of a secondary winding of a separate transformer, said secondary winding being electrically connected at its other end to said cathode of said thyratron tube.

8. Blast-timing means of the type claimed in claim 5, each of said thyratron tubes having a heater electrically connected to said cathode of said thyratron tube and to an end of a secondary winding of a separate transformer, said secondary winding being electrically connected at its other end to said cathode of said thyratron tube; said multivibrator circuit being provided with variable resistors operable for effecting frequency adjustment of said multivibrator outputs; and said resistors of said differentiation network being variable for effecting adjustment of the time-wise lengths of said direct-current projectile-firing pulse groups.

9. In combination with an aircraft having a propulsive jet engine provided with an air inlet and having armament units provided with projectile-firing tubular members firing in proximity to said air inlet, blast-controlling means for maintaining at innocuous level the atmospheric disturbances accompanying the discharge of projectiles from said armament units, said blast-controlling means comprising: blast-timing means periodically supplying firing voltages to said armament units in a sequence effecting the apportionment in a given order into chambers recited below of gaseous blasts emitted from said units in association with projectiles fired therefrom; and blast-deflecting means provided at each of said armament units and comprising said chambers mentioned above, said blast-deflecting means being operative for receiving from said tubular members said gaseous blasts apportioned thereto, reducing the velocity and density of gases of said blasts, and progressively discharging some of said gases overboard in directions leading away from their initial flow-direction; said given order of delivery of said blasts into said chambers being such that blasts discharged into separate chambers and likely, if delivered substantially simultaneously, to reinforce each other and produce together an atmospheric disturbance of more than innocuous level, are delivered to respective chambers at substantially separate times, whereby the atmospheric disturbances occasioned by the discharge of projectiles from said armament units are rendered harmless to components and operation of said aircraft and said jet engine.

10. A device for preventing malfunction in a jet engine propelling an aircraft having an air inlet opening for said engine and further having projectile-discharging tubular members firing in proximity to said air inlet, said device comprising, in combination with said air inlet and tubular members: first means for receiving gases of blasts emitted from said tubular members and for deflecting at least some of said gases away from the inlet opening through which air is provided to said engine; and means for apportioning said blasts to said first means in an order wherein blasts likely, if discharged simultaneously, to reinforce each other and thereby jointly produce an atmospheric disturbance of a severity capable of occasioning malfunction in said engine are delivered to said first means at substantially separate times.

11. For preventing malfunctions in a jet engine having an air inlet and propelling an aircraft having a plurality of armament units firing in proximity to the air inlet of the engine, a device comprising, in combination with said armament units and air inlet: blast-deflecting means including at least one chamber receiving gaseous blasts apportioned thereto by blast-timing means recited below from the armament units and discharging at least some of the gases of said blasts overboard at reduced velocity and density and in a direction leading away from their initial flow-direction; and blast-timing means for effecting delivery of said blasts to said at least one chamber in an order wherein blasts likely, if discharged simultaneously, to reinforce each other and thereby jointly produce an atmospheric disturbance of a severity capable of occasioning malfunction in said engine are delivered to said at least one chamber at substantially separate times.

12. In combination with an aircraft having a propulsive jet engine provided with an air inlet and having armament units provided with projectile-firing tubular members firing in proximity to said air inlet, blast-controlling means for maintaining at innocuous level the atmospheric disturbances accompanying the discharge of projectiles from said armament units, said blast-controlling means comprising: blast-timing means operative for apportioning the discharge in a given order into chambers recited below of gaseous blasts associated with the firing of projectiles from said tubular members; and blast-deflecting means comprising said chambers and operative for reducing the density and velocity of gases of said blasts and for releasing said gases into the atmosphere in directions leading away from their initial flow-direction, said given order of discharge of said blasts being such that blasts discharged into separate chambers and likely, if discharged substantially simultaneously, to reinforce each other and together produce an atmospheric disturbance of higher than innocuous level are discharged at substantially separate times, whereby the atmospheric disturbances occasioned by the discharge of projectiles from said armament units are rendered harmless to components and operation of the aircraft and its jet engine.

13. The blast-controlling means claimed in claim 12, said blast-timing means supplying electrical firing voltages to said armament units in a sequence effecting said apportionment of said blasts into said chambers in said given order.

References Cited in the file of this patent

UNITED STATES PATENTS

| | | |
|---|---|---|
| 2,097,962 | Boussel | Nov. 2, 1937 |
| 2,402,632 | Ivanovic | June 25, 1946 |
| 2,403,641 | Den Ouden | July 9, 1946 |
| 2,428,359 | De Permentier | Oct. 7, 1947 |
| 2,459,181 | Rosen et al. | Jan. 18, 1949 |
| 2,639,379 | Blancher | May 19, 1953 |
| 2,787,194 | Peterson | Apr. 2, 1957 |